BEST AVAILABLE COPY

3

R. DOUGLAS.

Assignor, by mesne assignments, to J. WOOD & C. L. SMITH.

Machine for Making Cop-Tubes.

No. 8,328. Reissued July 9, 1878.

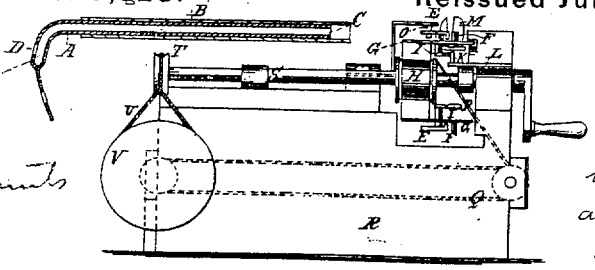

hollow, admits air.

continuous tube formed by folding paper over A which hollow and has opening D to admit air grippers E F and cutters M carried by belt H draw off tube and cut it into proper length M operated by cam N E by pins K & Q Tube falls down chute P onto belt Q and carried into drying chamber R

Fig. 2.

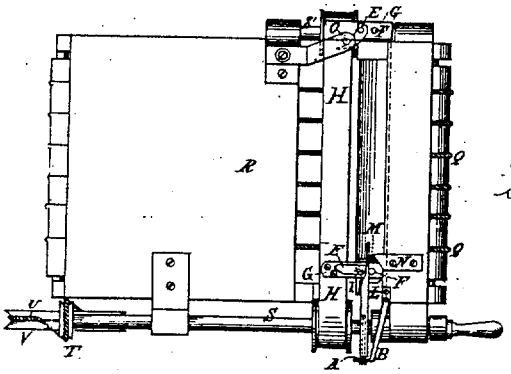

Fig. 3.

OK

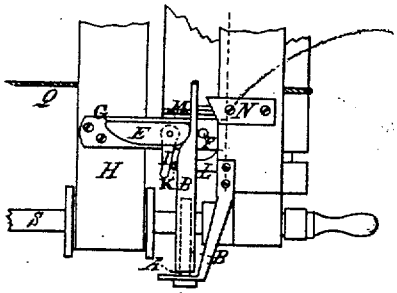

Closes shears M.

Fig. 4.

Witnesses:
Charles G. Chick.
J. P. Tucker

Inventor:
Robert Douglas
by A. H. Spencer
his atty

[illegible] land, assignor, [illegible], Mass. Pat-

[illegible] continuous tube [illegible] so carried on [illegible] a chute to an [illegible]

[illegible] with the tube [illegible] thereon, adapted to [illegible] forth.

The [illegible] forming mandrel, of a series of traveling [illegible] adapted to [illegible] on the mandrel the tube formed thereon, and a [illegible] apparatus, substantially as described.

The combination, with a hollow mandrel and a series of traveling [illegible] of the cutting and drying apparatus herein described, and devices [illegible] water tube to deliver it from the mandrel, [illegible]

H. PETERS, PHOTO-LITHOGRAPHER, WASHINGTON, D. C.

UNITED STATES PATENT OFFICE.

ROBERT DOUGLAS, OF GLASGOW, SCOTLAND, ASSIGNOR, BY MESNE ASSIGNMENTS, TO JAMES WOOD, OF FALL RIVER, AND CALEB L. SMITH, OF LOWELL, MASSACHUSETTS.

IMPROVEMENT IN MACHINES FOR MAKING COP-TUBES.

Specification forming part of Letters Patent No. 126,192, dated April 30, 1872; Reissue No. 8,328, dated July 9, 1878; application filed May 20, 1878.

*To all whom it may concern:*

Be it known that I, ROBERT DOUGLAS, formerly of Lowell, Massachusetts, now of Glasgow, Scotland, have invented certain Improvements in Machines for Making Cop-Tubes, of which the following is a specification:

My improvements may be described under three heads, according to the specific functions of the different parts of the mechanism.

The first part of my invention consists in a novel construction of the carrying or drawing apparatus, whereby the tube is drawn from the mandrel on which it is formed preparatory to being cut into lengths and dried.

The second part of the invention consists in the combination, with such drawing mechanism, of cutting apparatus, whereby the tube drawn from the mandrel may be cut into the proper length for carrying to the drying apparatus.

The third part of the invention consists in the arrangement of such drawing and cutting mechanism with reference to the drying apparatus, all substantially as specified.

In the drawings, Figure 1 is a longitudinal section of the mandrel and the tube formed thereon. Fig. 2 is a side elevation of the drawing, cutting, and drying apparatus; and Fig. 3, a plan of same, showing the relation of the mandrel thereto. Fig. 4 is an enlarged view of the lower right-hand corner of Fig. 3.

The distinguishing peculiarity of my invention is an endless belt carrying a series of traveling gripers, which seize the newly-formed paper tube, draw it endwise from the mandrel, and carry it forward, so that at the proper moment the portion so drawn forward may be cut off by any suitable means and removed to be dried, while the succeeding tubes are seized and treated in like manner, that the operation may be continuous.

A represents the mandrel of a cop-tube machine, on which a continuous paper tube, B, is formed by bending a paper strip upon it and pasting the edges which are lapped between the point where the said mandrel is supported and its end C, from which the tube is continuously drawn.

It is not necessary for the purposes of this case to describe the grooved wheels, guides, and pasting apparatus which may be used in the formation of the tube. The liability of the tube thus formed to collapse as it passes from the mandrel in consequence of atmospheric pressure is overcome by making the mandrel hollow, with an opening, D, for the admission of air to the tube B as it is drawn from the tube-forming mechanism.

The apparatus I have devised for drawing the tube through the machine in which it is formed and off the mandrel A consists of an endless belt, H, mounted upon suitable pulleys on the shafts S S′, and carrying a pair of gripers, which seize the tube and carry it steadily forward.

As illustrated in the drawings, the tube is received between a griping-pawl, E, and a fixed griping-jaw, F, on a bar, G, carried by the endless belt H, said pawl being caused to gripe the tube by the finger I coming in contact with the pin K, supported in the path of the finger in any suitable way—say on arm L, projecting from the supporting-frame.

There are preferably three of these pairs of gripers on the belt H, also as many cutting-shears M, for severing the tube when a sufficient length is drawn out. Each pair of cutters is located just in advance of each pair of gripers, and the tube is drawn between the cutting-blades by the gripers in advance of them, and these shears are closed upon the tube by the bar or rod N, and cut it off immediately after the gripers behind have taken hold of it. At the same time that the tube is cut the gripers in advance of the shears are opened by the pin O, and the piece of tube cut off is released from this part of the apparatus. Thus the tube is griped by one griper and cut off before being released by the preceding one, so that the drawing of the tube from the mandrel is uninterrupted.

The arrangement of devices shown for delivering the cut tubes to the drying apparatus may be briefly described. A chute, P, receives the piece of tube as it is cut off, and conducts it to the endless carriers Q, which convey it into the heating-chamber R. These carriers Q are driven from the main shaft S by means of the pulleys T V and belt U. The location of the drawing and cutting mechanism at one side of the drying-chamber and over the endless carriers running through it allows the cut pieces to be delivered to said carriers by gravity, thus accomplishing the work simply and economically.

I claim as of my invention—

1. In a tube-forming machine, the combination, with the tube-forming mandrel, of an endless belt and gripers carried thereon, adapted to seize the tube and carry it forward, substantially as set forth.

2. The combination, with a tube-forming mandrel, of a series of traveling gripers, adapted to draw from the mandrel the tube formed thereon, and a cutting apparatus, substantially as described.

3. The combination, with a hollow mandrel and a series of traveling gripers, of the cutting and drying apparatus herein described, said devices co-operating to form a cylindrical paper tube to deliver it from the mandrel, to cut it into proper lengths, and to dry it for use without flattening or collapsing the body of the tube, substantially as set forth.

ROBERT DOUGLAS. [L. S.]

Witnesses:

JAS. STEVENSON,
*Clerk at Law, Glasgow.*

ANDREW EDDIE,
*Clerk at Law, Glasgow.*